(12) United States Patent
Deckard et al.

(10) Patent No.: US 11,529,853 B2
(45) Date of Patent: Dec. 20, 2022

(54) MODULAR CONTAINMENT SYSTEM AND METHOD

(71) Applicant: Polaris Industries Inc., Medina, MN (US)

(72) Inventors: Aaron D. Deckard, Zionsville, IN (US); Jason L. Bennett, Buderim (AU); Terrence D. Moncure, Long Beach, CA (US)

(*) Notice: Subject to any disclaimer, the term of this patent is extended or adjusted under 35 U.S.C. 154(b) by 0 days.

(21) Appl. No.: 17/068,010

(22) Filed: Oct. 12, 2020

(65) Prior Publication Data
US 2021/0114445 A1 Apr. 22, 2021

Related U.S. Application Data

(60) Provisional application No. 62/915,719, filed on Oct. 16, 2019.

(51) Int. Cl.
| | |
|---|---|
| *B60J 7/14* | (2006.01) |
| *B60J 7/16* | (2006.01) |
| *B60P 7/02* | (2006.01) |
| *B60J 7/11* | (2006.01) |
| *B60P 7/04* | (2006.01) |

(52) U.S. Cl.
CPC ............... *B60J 7/141* (2013.01); *B60J 7/11* (2013.01); *B60P 7/02* (2013.01); *B60P 7/04* (2013.01)

(58) Field of Classification Search
CPC ....... B60J 7/04; B60J 7/041; B60J 7/06; B60J 7/141; B60J 7/1607; B60P 7/02; B60P 7/04

USPC .......... 296/100.01, 100.02, 100.011, 100.17
See application file for complete search history.

(56) References Cited

U.S. PATENT DOCUMENTS

| | | | | |
|---|---|---|---|---|
| 4,738,274 | A | * 4/1988 | Heath | B60P 7/02 135/121 |
| 4,813,734 | A | * 3/1989 | Hoover | B60J 7/102 296/100.17 |
| 6,224,140 | B1 | * 5/2001 | Hoplock | B60J 7/10 296/100.18 |
| 6,431,634 | B1 | * 8/2002 | Ananian | B60J 7/062 296/100.05 |
| 6,655,725 | B2 | * 12/2003 | Soldatelli | B60J 7/08 296/100.01 |
| 7,988,218 | B1 | * 8/2011 | Devine | B62D 33/044 296/100.02 |
| 8,061,758 | B2 | 11/2011 | Maimin et al. | |
| 8,348,329 | B2 | * 1/2013 | Soldatelli | B60J 7/1621 296/100.1 |
| 8,690,224 | B2 | 4/2014 | Maimin et al. | |
| 9,744,836 | B1 | * 8/2017 | Singer | B60J 7/141 |
| 10,005,347 | B1 | * 6/2018 | Singer | B60J 7/041 |
| 2003/0168879 | A1 | * 9/2003 | Grudek | B60P 3/40 296/100.15 |

(Continued)

OTHER PUBLICATIONS

Office Action dated Nov. 17, 2021, in corresponding Canadian Application No. 3,096,447.

*Primary Examiner* — Jason S Daniels
(74) *Attorney, Agent, or Firm* — Eric Hanscom

(57) ABSTRACT

A system and method operable with a vehicle to selectively enclose a portion of the vehicle with a containment system. The containment system may be optional and/or configurable by a user. The containment system may be modular or configurable and may be used to cover any appropriate portion of the vehicle.

31 Claims, 8 Drawing Sheets

(56) References Cited

U.S. PATENT DOCUMENTS

| | | | | |
|---|---|---|---|---|
| 2004/0207231 A1* | 10/2004 | Hoffmann | ................. | B60J 7/10 |
| | | | | 296/100.17 |
| 2014/0367990 A1* | 12/2014 | Dost | ................... | B62D 33/044 |
| | | | | 296/100.17 |
| 2015/0197141 A1 | 7/2015 | Cortez | | |
| 2019/0061496 A1* | 2/2019 | Singer | ................... | B62D 33/08 |

* cited by examiner

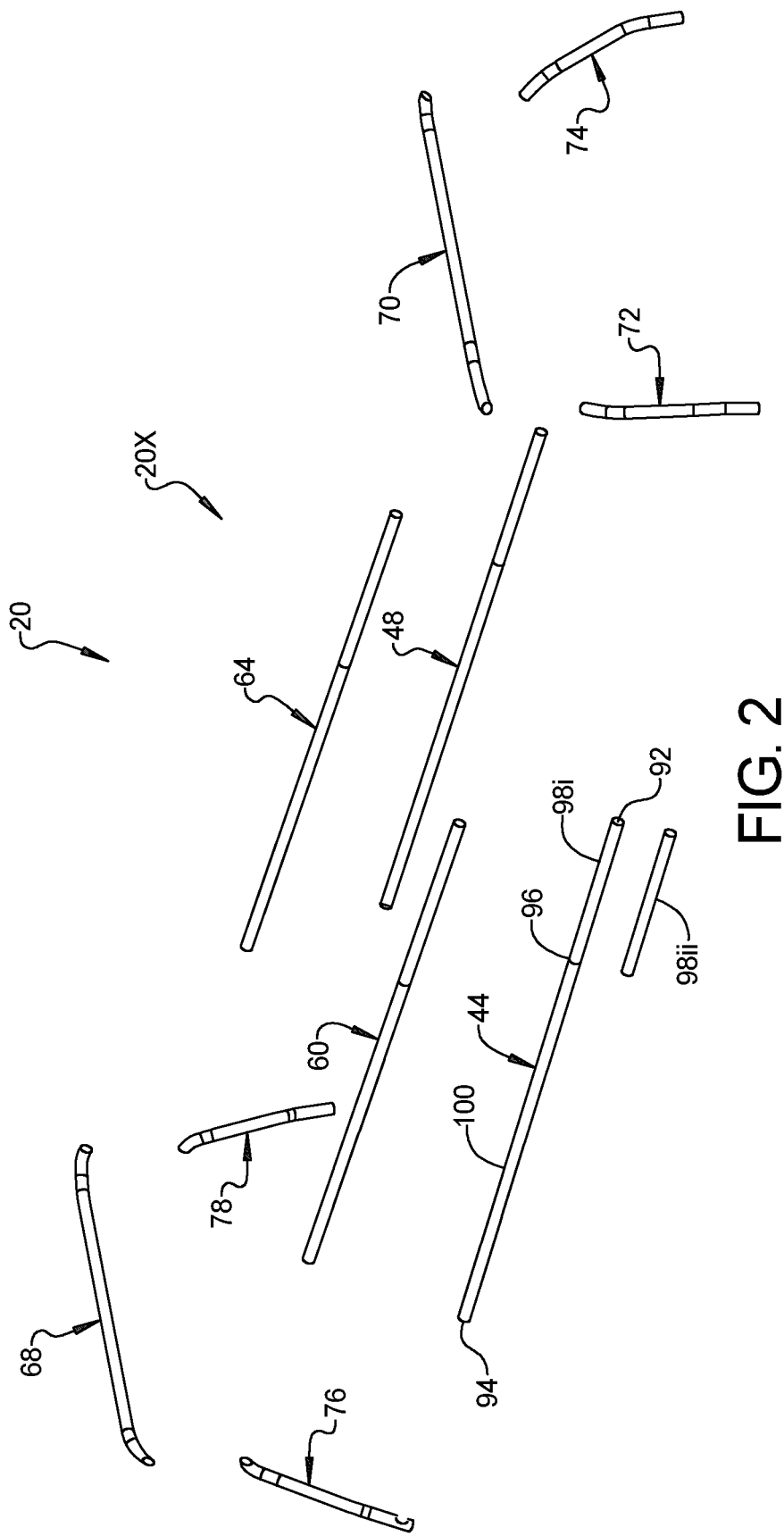

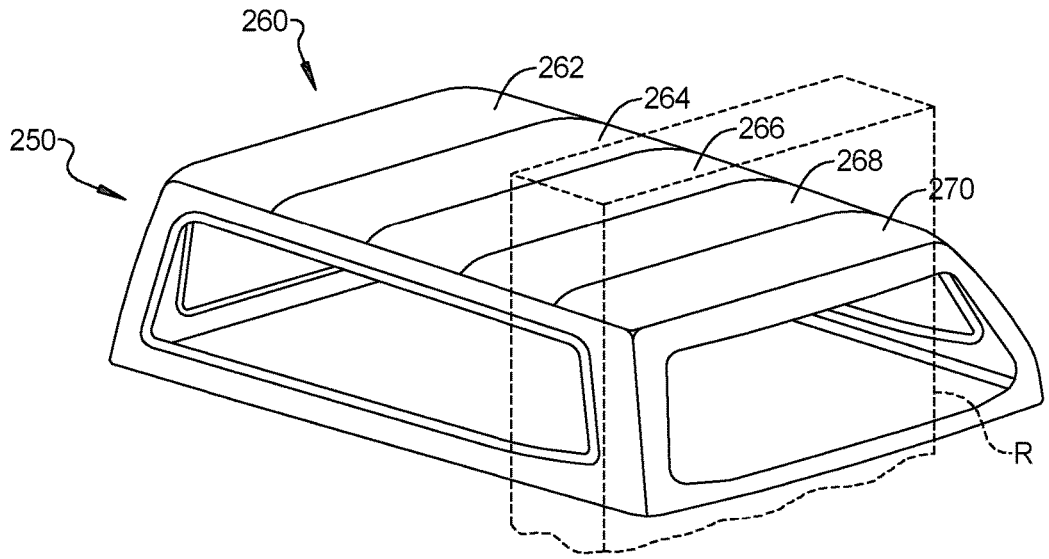
FIG. 6
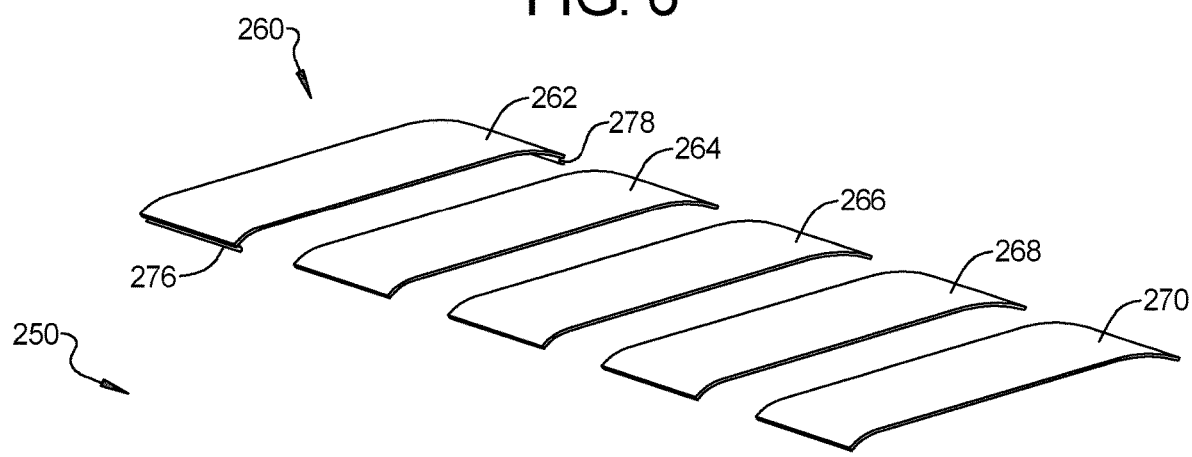
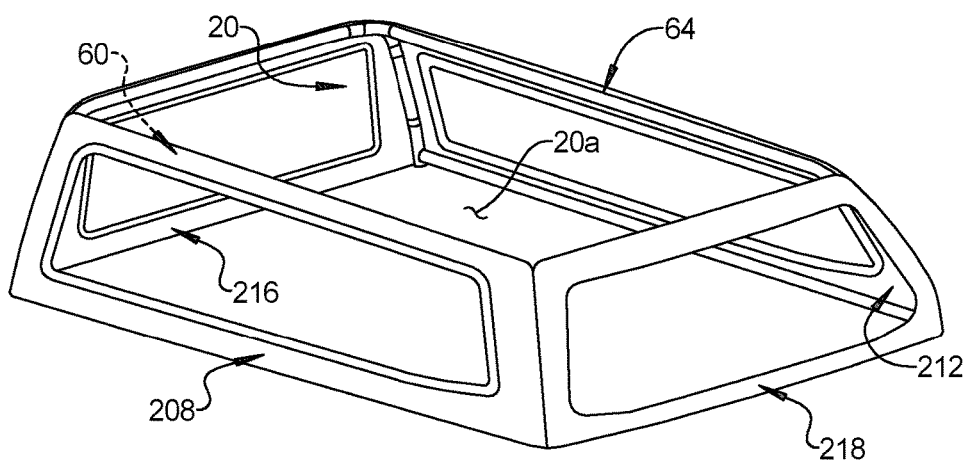
FIG. 7

MODULAR CONTAINMENT SYSTEM AND METHOD

CROSS-REFERENCE TO RELATED APPLICATIONS

This application is a non-provisional application that claims benefit of U.S. Patent Application No. 62/915,719, filed on Oct. 16, 2019.

FIELD

The subject disclosure relates to an assembly, in particularly to a modular assembly for a vehicle.

BACKGROUND

This section provides background information related to the present disclosure which is not necessarily prior art.

A vehicle may include any appropriate type of mobile vehicle that may be operated by a first user and carry one or more users and/or one or more objects. The vehicle may include a wheeled vehicle, a tracked vehicle, a combination thereof, or other appropriate mobility system. The vehicle may include a motor or engine that may be powered with a selected power source (e.g. gasoline, electrical, or the like). During operation the vehicle may be moved between locations to carry or move the user and/or one or more objects.

SUMMARY

This section provides a general summary of the disclosure, and is not a comprehensive disclosure of its full scope or all of its features.

Disclosed is a system and method operable with a vehicle to selectively enclose a portion of the vehicle with a modular or selectable containment system. In various embodiments, the vehicle may generally include a drive or operating compartment and a utility or storage section. The utility or storage section may generally include an open compartment that may be selectively enclosed or covered with a cargo area containment system also referred to as a modular or selectable containment system. The cargo area containment system may be optional and/or configurable by a user. It is understood, in various embodiments, the modular or configurable cover may be used to cover any appropriate portion of the vehicle.

In various embodiments, a cargo enclosure system may include a frame that may be connected to a portion of the vehicle to at least partially or fully enclose the cargo area. In various embodiments, the frame may be modular such that it may be assembled in a selected manner by a user. The frame may be disassembled and/or provided in a disassembled configuration for ease of shipping and/or configuration by the user. Further, the frame assembly may be connected together with various mechanisms to provide a rigid or semi-rigid structure for mounting selected enclosure panels. Selected enclosure panels may be selectively positioned on a portion of the frame to assist in enclosing or partially enclosing the cargo area. Thus, a user may selectively enclose, in a selected manner, a cargo area of a vehicle to assist in maintaining or enclosing the cargo area to hold one or more items and/or provide an enclosure for the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is an exploded view of a cargo containment frame assembly, according to various embodiments;

FIG. 6 is an assembled view of a cargo containment system with a selected panel enclosure configuration, according to various embodiments;

FIG. 7 is a partial exploded view of FIG. 6;

Figure 8A:
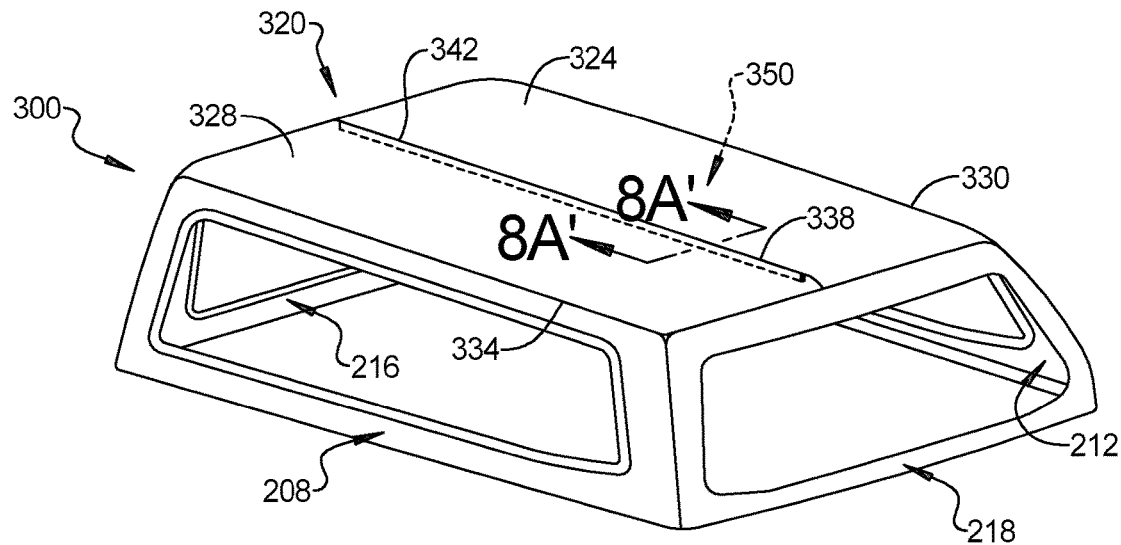
FIG. 8A is an assembled cargo containment system according to a selected configuration, according to various embodiments.
Figure 8A:
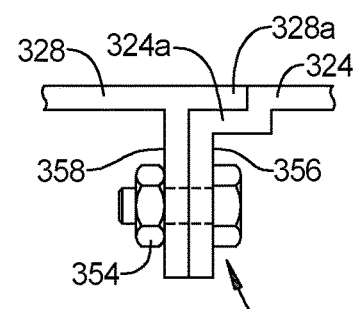
Figure 8B:
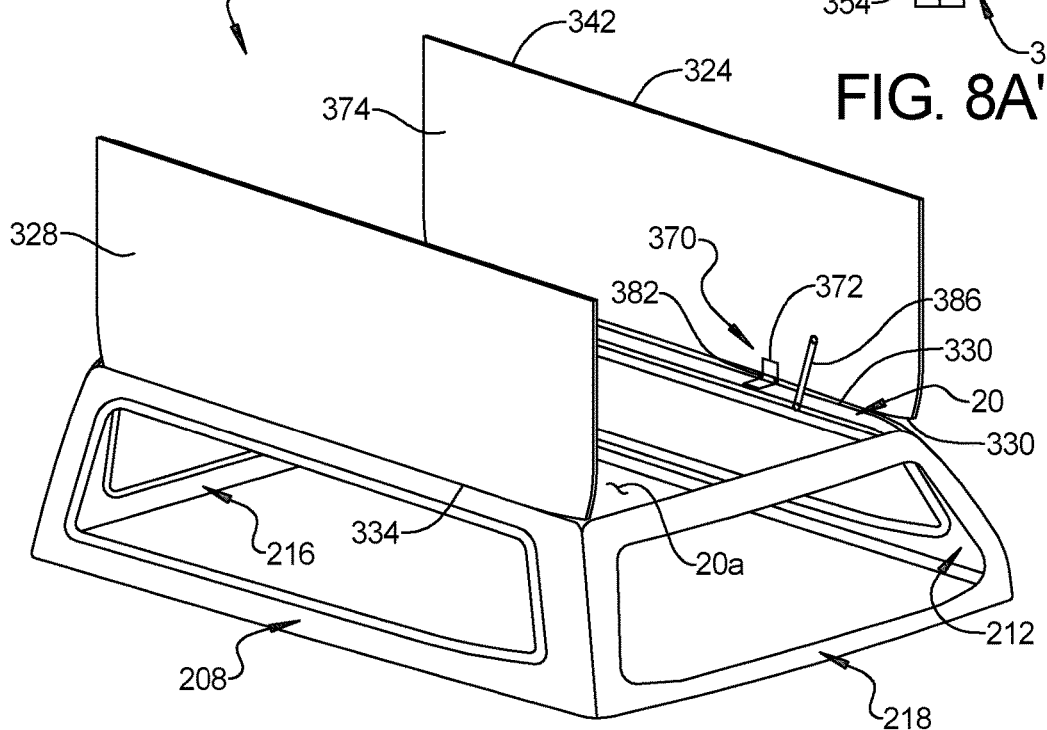
Figure 9A:
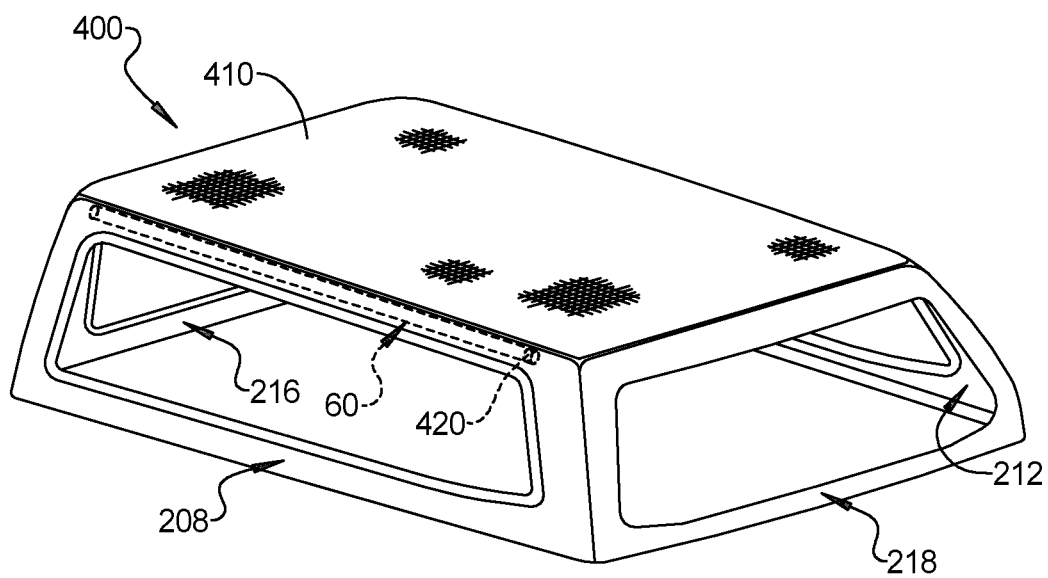
Figure 9B:
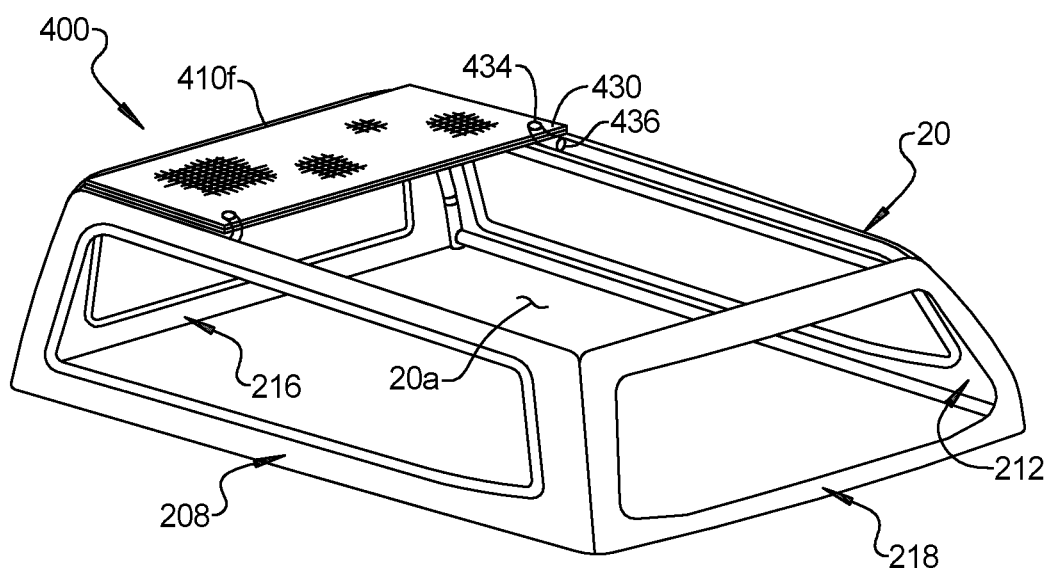
Figure 10:
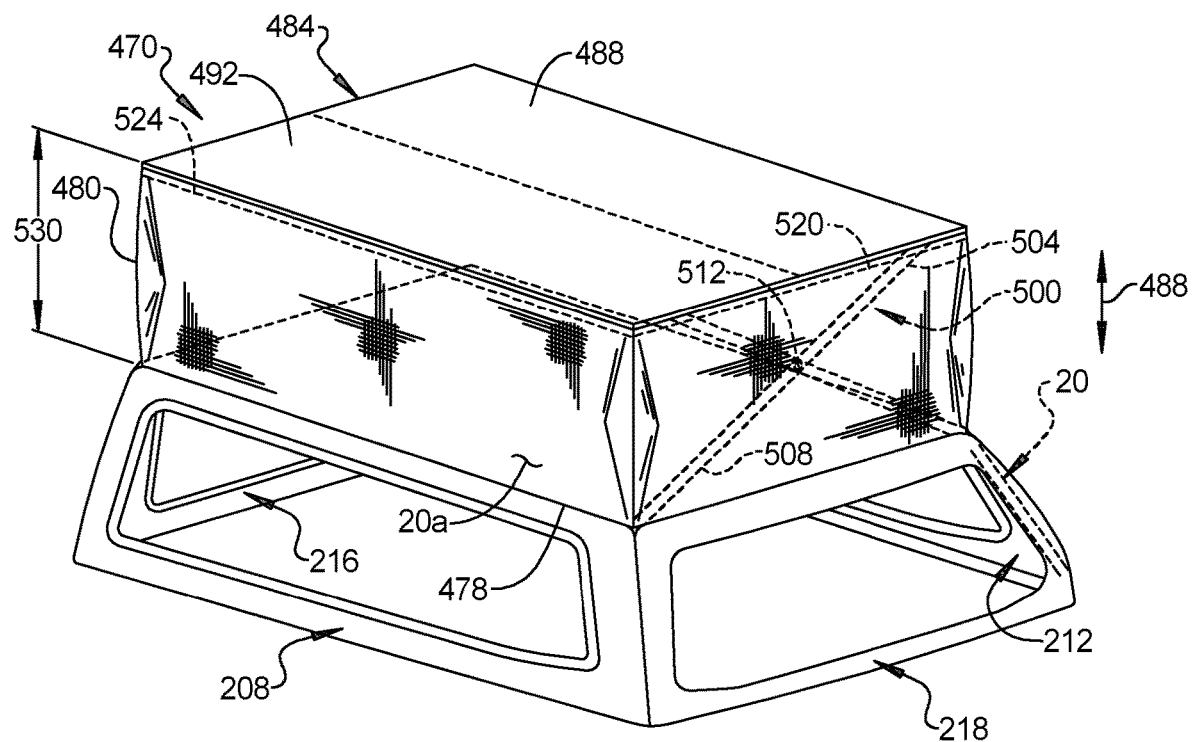

FIG. 8A' is a detail view of a panel connection;

FIG. 8B is the cargo containment system of FIG. 8A, according to a selected configuration;

FIG. 9A is a cargo containment system, in a selected configuration, according to various embodiments;

FIG. 9B is the cargo containment system of FIG. 9A in a second configuration;

FIG. 10 is a cargo containment system, according to various embodiments; and

Figure 11:
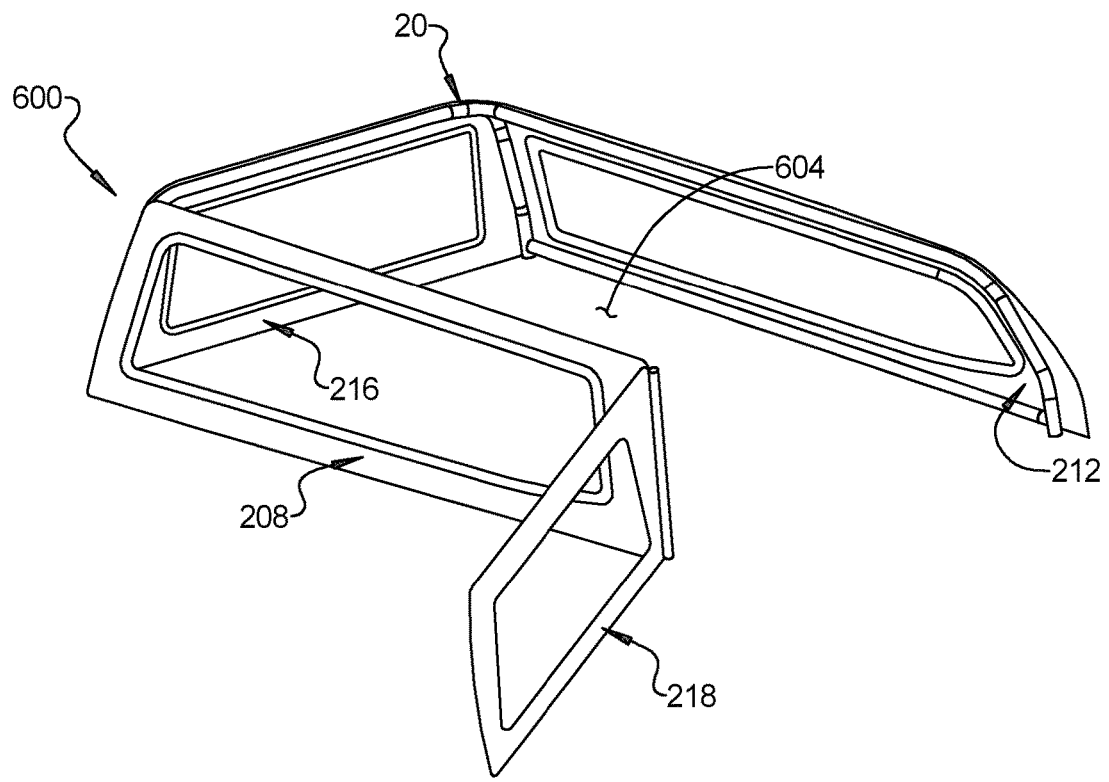

FIG. 11 is a perspective view of a cargo containment system with selected panels on an assembled and optional frame assembly, according to various embodiments.

Corresponding reference numerals indicate corresponding parts throughout the several views of the drawings.

DETAILED DESCRIPTION

Example embodiments will now be described more fully with reference to the accompanying drawings.

Figure 1A:
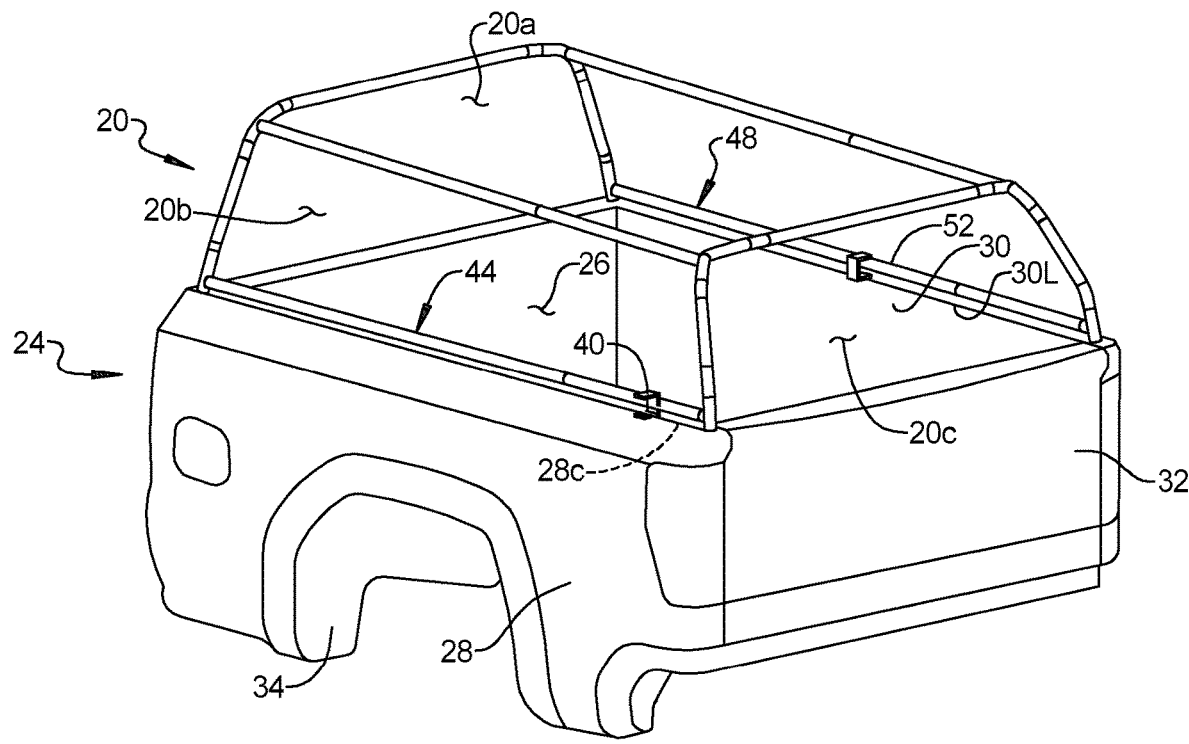
FIG. 1A is a perspective view of a cargo area of the vehicle in an assembled cargo containment frame assembly.
Figure 1B:
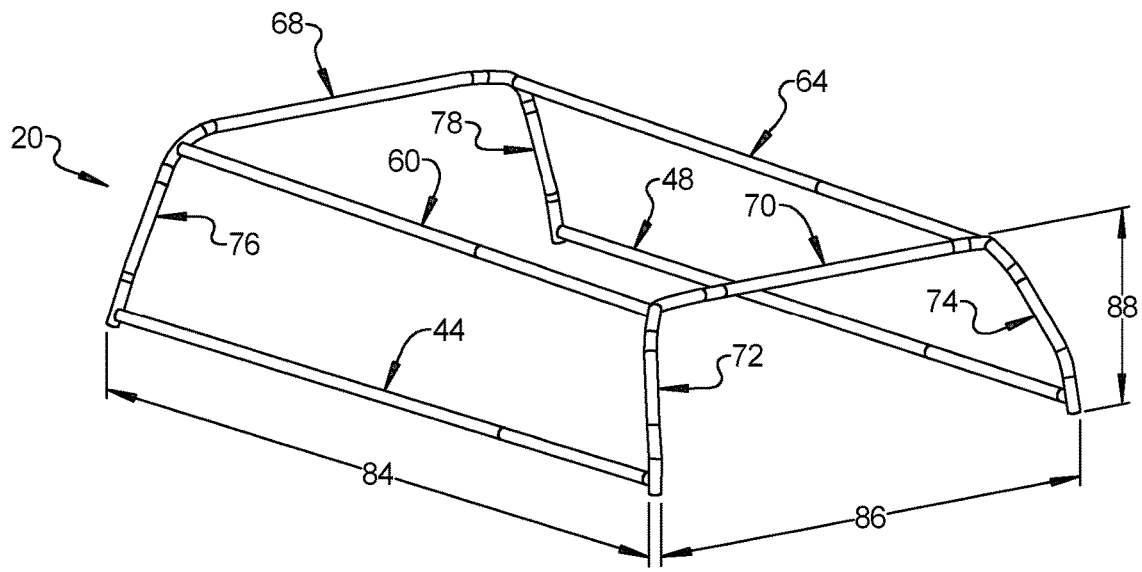
FIG. 1B is a perspective view of an assembled cargo containment frame assembly, according to various embodiments.

With initial reference to FIGS. 1A and 1B, a cargo containment frame assembly 20, also referred to as a frame assembly, is illustrated. The frame assembly 20 may be interconnected with various portions, such as a vehicle 24. In various embodiments, the vehicle 24 may include a cargo containment area 26. The cargo containment area 26 may be surrounded by one or more side or body panels 28, 30. Further, in various embodiments, a tailgate or door or movable body panel 32 may be provided. As illustrated in FIG. 1A, the cargo containment area 26 may be positioned around a wheel or other portion, such as may be contained within a wheel well 34.

The vehicle 24 may be used to carry cargo in the cargo containment area 26. The frame assembly 20 may be positioned about or relative to the cargo containment area 26, such as being mounted to one or more of the body panels or side panels 28, 30. In various embodiments, the side panels 28, 30 may include a ledge or ridge 28L, 30L. One or more clamps may be positioned to hold the frame assembly 20 relative to the vehicle 24. For example, a first clamp 40 may clamp a first rail member 44 to the ledge 28L of the body panel 28. Similarly, a second clamp 48 may clamp a second rail 52 to the second ledge 30L.

Thus, the frame assembly 20 may be clamped or held relative to the vehicle 24. It is understood that any selected number of clamps such as two or more may be used to hold the frame assembly 20 relative to the vehicle 24. Further, the clamps may be of any selected type such as including a bolt and nut, thumb screw where the clamp may include an internal or selected threading, or the like. Regardless, the frame assembly 20 may be removable attached to the vehicle 24 with a selected connection system, such as the clamps 40, 48. In various embodiments, the clamps 40, 48 may be provided in any appropriate number to connect the frame 20 to the vehicle 24. Moreover, the clamps 40, 48 may be provided or configured to slide on one or more of the frame members of the frame 20 to positioning relative to the vehicle 24. Thus, the clamp 40, 48 may be moved to an appropriate connection location relative to the vehicle for connection thereto.

The frame assembly 20 alone and/or the frame assembly relative to the vehicle 24 may define one or more voids. For example, a top void 20a, a side void 20b, and a rear void 20c. Each of the voids is a space or opening defined between one or more of the members of the frame assembly 20 and/or one or more members of the frame assembly 20 and the vehicle 24. One or more of the voids may be selectively covered, as discussed further herein.

With specific reference to FIG. 1B, the frame assembly 20 may include a plurality of members or portions such as including the first rail 44 and the second rail 48. The rails 44, 48 may also be referred to as lower longitudinal rails. Similarly, the frame may include a third rail 60 and a fourth rail 64. The third and fourth rail 60, 64 may be upper longitudinal rails.

The frame assembly 20 may further include a first and second and/or forward and rearward cross or horizontal rails 68, 70. The horizontal rails 68, 70 may be positioned to interconnect or span between the upper longitudinal rails 60, 64 such as near terminal ends thereof. Further, the frame assembly 20 may include a plurality of vertical rails such as a first vertical rail 72, a second vertical rail 74, a third vertical rail 76, and a fourth vertical rail 78. The vertical rails 72, 74, 76, 78 may be positioned near the terminal ends of the longitudinal rails 44, 48, 60, 64 to hold or mount the upper rails 60, 64, 68, 70 above the body panels of the vehicle 24 and/or above the first and second longitudinal rails 44, 48.

Accordingly, as illustrated in FIG. 1B, the frame assembly 20 may be assembled to define or have a selected length 84, width 86, and height 88. It is understood that the length 84, width 86, and height 88 may be the same for the upper and lower rails in rearward and forward positions and/or may be configured, such as modular portions, to vary based upon a selected configuration of the user.

The frame assembly 20 may be a modular or selectable containment system and/or a frame for a modular or selectable containment or cover system. As discussed herein, the frame assembly 20 may be connected in a selected manner to the vehicle 24. Various additional panels may also be fit to the frame assembly to form additional or alternative configurations of the modular or selectable containment system. Thus, the modular or selectable containment system may be a configurable cover or containment system formed of the frame assembly 20 alone and/or additional or alternative panel members.

With continuing reference to FIGS. 1A and 1B and additional reference to FIG. 2, the frame assembly 20 may include each of the frame members, which may be selectively connected together. For example, the first longitudinal member 44 may extend from a first terminal end 92, which may be a rear terminal end, to a second terminal end 94, which may be a forward terminal end. It is understood that each of the frame members may extend between terminal ends, even though not specifically identified herein. Moreover, each of the members may be adjustable in length, such as with an adjustment portion or feature 96. For example, a first portion 98 of the member 44 may slide within a second portion 100 of the member 44 to allow for adjustment of a length between the two terminal ends 92, 94. Further, the first portion 98 may be selected from the first portion 98i or a second portion 98ii that may be of a different length than the first portion 98i. Thus, the member 44 may be selected to be an appropriate or selected length by the user.

In various embodiments the frame assembly 20 may be provided as a kit including all of the members or a plurality of portions to form the frame members. For example, the member 44 may include the first portion 98i and first portion 98ii to be selected by the user to be interconnected with the second portion 100. Alternatively and/or in combination therewith, the user may slide the selected first portion 98 relative to the second portion 100 to select a length of the member 44 between the first and second terminal ends 92, 94. One skilled in the art will understood that each of the members of the frame 20 may be likewise selected for size and dimension to achieve the frame assembly 20 to fit the vehicle 24 by the user.

In various embodiments, therefore, the frame assembly 20 may be provided as a kit 20x including the member portions as illustrated in FIG. 2. The user may assemble any appropriate number of the frame portions to form the frame 20 that may be selectively mounted to the vehicle 24, as discussed above. Thus, the kit 20x may include a plurality of members that are interconnected or selectively connected by the user to form the frame 20. Further, the frame 20 is merely exemplary and is not required to form the module containment system as discussed herein. The frame 20 may support one or more panels, as discussed herein, to form a containment system. Nevertheless, as discussed herein, the panels may for or integrate a support frame as discussed herein without a separate frame.

Figure 3:
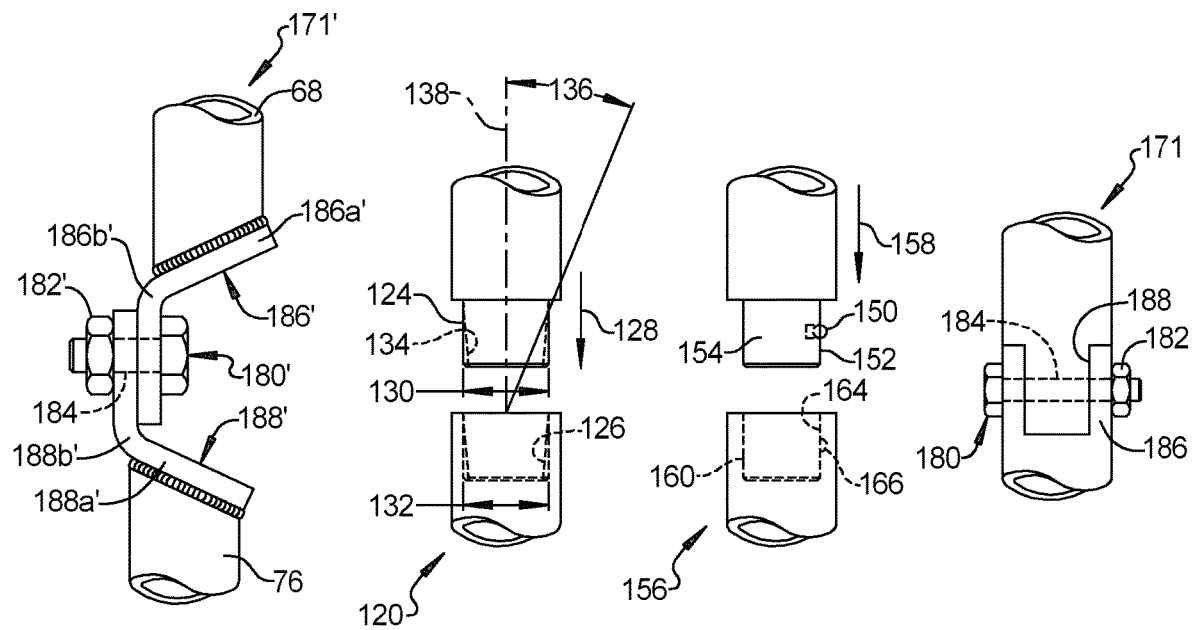
FIG. 3 illustrates a plurality of connection mechanisms for frame members, according to various embodiments.

With continuing reference to FIG. 2 and additional reference to FIG. 3, the various frame members may be connected in any appropriate manner. In various embodiments for example, a taper or friction fit connection 120 may be used. As illustrated, the friction connection 120 may include a first friction or taper portion 124 that may interferingly engage an internal or friction engagement portion 126. The two members may be moved together, such as the first portion 124 in the direction or arrow 128, to engage the internal engagement portion 126. A dimension, such as a cross-dimension 130, may be sized to be substantially the same or sized to frictionally engage the internal connection 126 that has a dimension 132. In various embodiments, an external wall 134 of the connection portion 124 may have an angle 136 relative to a central axis 138. The angle 136 may form a taper fit or taper connection to the internal connection 126 of the second portion. Thus, the two frame members, such as the first longitudinal frame member 44 and the first vertical member 72 may be connected by a user.

With continuing reference to FIG. 3, an additional and/or alternative connection may include snap or clip connection that may include a ball member 150. The ball 150 may be biased toward an outer edge 152 of a first connection portion 154. The ball 150 may be moved inward, generally in the direction of arrow 156, when the first portion 154 is moved in the direction of arrow 158 toward a second connection portion 160. The ball 150 may be moved in the direction of 156 upon engagement with an internal wall 164 of the second connection portion 160. The ball 150 may engage or be biased into a locking or receiving hole 166 when the first connection portion 154 is moved a selected distance into the second connection region 160. Thus, the first connection portion 154 may be connected to the second connection portion 160 and may be held in place with the detent or biasing ball or portion 150. It is understood that any appropriate biasing portion may be used such as a spring or biasing material, such as rubber. Further, the bias or locking member 150 may be a ball, pin, or any other appropriate connection.

With continuing reference to FIG. 3, an additional or alternative connection mechanism 171 may include a bolt 180 and a nut 182. The bolt 180 may include a shank 184 that is threaded to receive threads or interior threads of the nut 182. The bolt 180 may engage a first connection portion 186 and the shank engage a second connection portion 188 and the nut 182 engage the first connection portion 186. It is understood that the nut and/or bolt may include a thumb or hand tightening feature, such as a wing nut or the like.

With continuing reference to FIG. 3, a further connection mechanism 171' may be an additional or alternative connection mechanism to those discussed above. The connection mechanism 171' may be similar to the connection mechanism 171 discussed above. For example, the connection mechanism 171' may include a bolt 180' and a nut 182'. The bolt 180' may include a shank 184' that extends between a first plate or connection member 186' and a second connection member 188'. In particular, the first connection member 186' may include a first portion 186a' and a second portion 186b'. The second portion 186b' may be formed at an angle relative to the first portion 186a'. Similarly the second portion 188' may include a first portion 188a' and a second portion 188b'. The second portion 188b' may be formed at an angle relative to the first portion 188a'. Accordingly, the two second portions 186b' and 188b' may be positioned substantially parallel with one another to allow for connection by the bolt 180. Similarly this may allow for the respective first portions 186a' and 188a' to include substantially flat surfaces to connect respective frame members such as the frame members 68 and 76. It is understood that any appropriate frame members may be connected and the two frame members 68, 76 are merely exemplary. Further the connection portions 186', 188' may be formed in any appropriate configuration to allow for secured fixation to the respective frame members 68, 76 and to provide a connection portion or region, such as by the alignment or parallel adjacent placement of the respective second portions 186b' and 188b'.

Accordingly, the various members, such as the first longitudinal member 44 and the first vertical member 72 may be interconnected in one or a plurality of ways. The connection may include bias or mechanical connections of the various members to form the frame assembly 20. The user may assemble the frame assembly 20 for use and/or connection to the vehicle 24.

Figure 4:
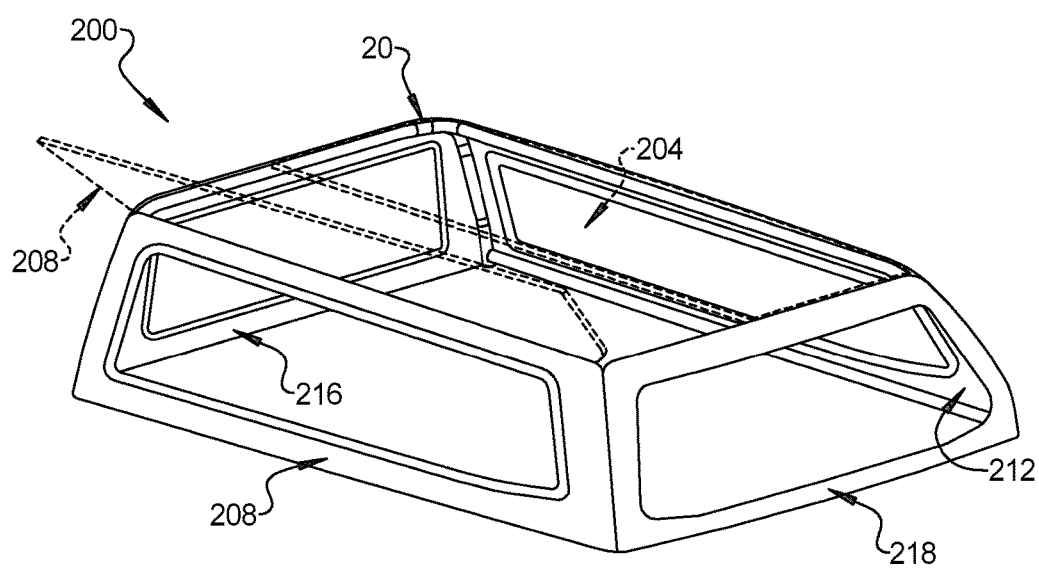
FIG. 4 is a perspective view of a cargo containment system with selected panels on an assembled and optional frame assembly, according to various embodiments.
Figure 5:
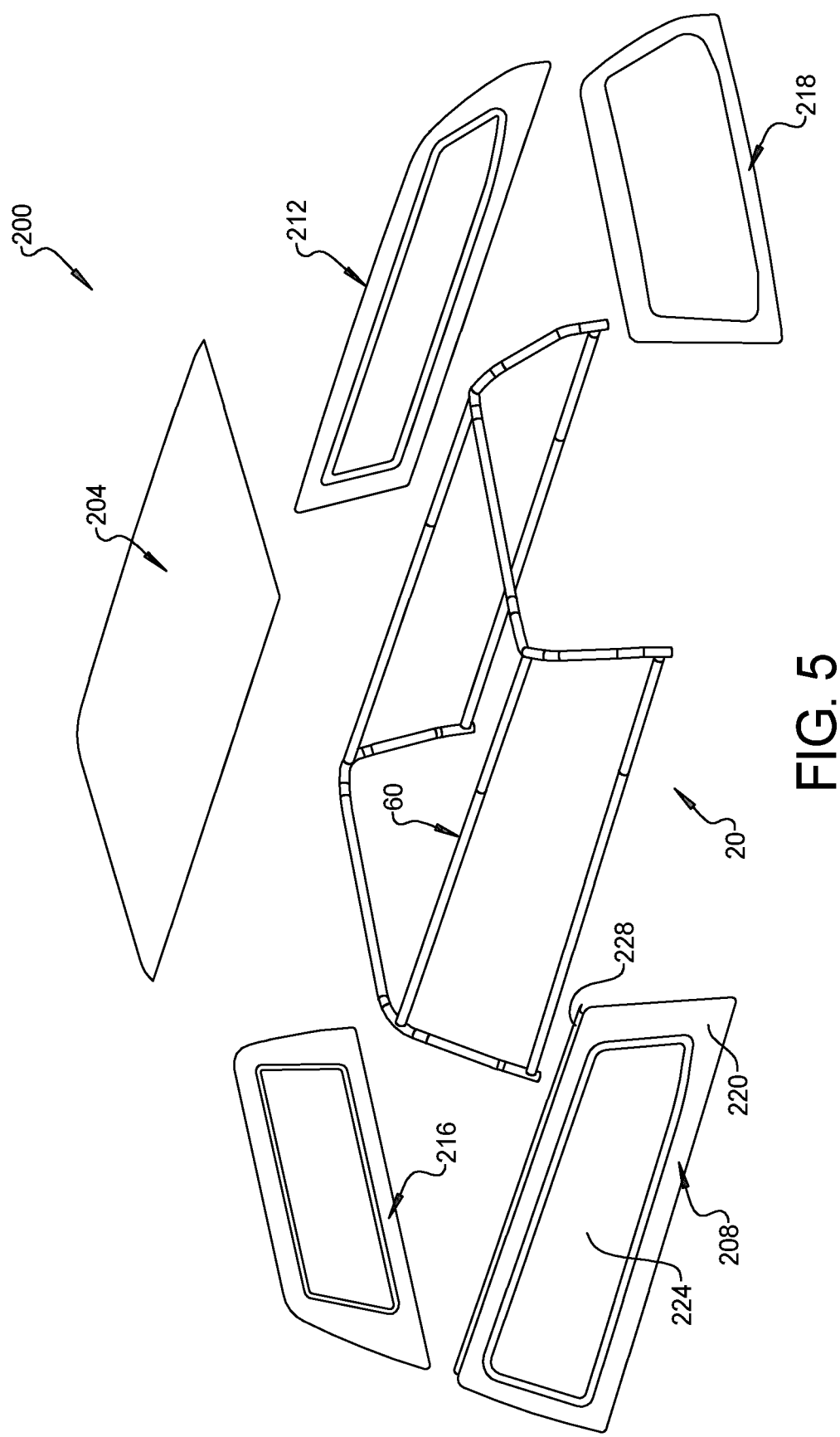
FIG. 5 is an exploded view of FIG. 4.

Turning reference to FIG. 4 and FIG. 5, a configurable cover (also referred to as a topper or compartment assembly) 200 is illustrated. The topper assembly 200 may exemplary include the frame assembly 20 that is covered entirely or partially with one or more panels. In various embodiments, the frame 20 may define one or more voids that may be covered with selected panels. In various embodiments, however, or additionally, the panels may form a frame or support without the separate frame 20.

For example, as illustrated in FIG. 4, a top panel 204 may be connected to the top rails 60, 64, 68, and 70. One or more side panels, such as a first side panel 208 and a second side panel 212 may be connected to the frame assembly 20. Further, a forward panel 216 and a rearward panel 218 may also be connected to the frame assembly 20. The panels 204-218 may be separately connected to the frame assembly 20. With continuing reference to FIG. 4 and additional reference to FIG. 5, the panels 204-218 may be separate members that may be selectively connected to the frame 20. Further, less than all of the panels may be connected to the frame as selected by a user.

Each of the panels may have selected features, such as a solid exterior portion, such as a solid frame 220 of the first panel 208 that may surround a window or clear portion 224. Each of the panel members may include a similar construction or selectively not include a window or clear portion, such as the top panel 204. Accordingly, the topper assembly 200 may include features similar to a truck bed topper.

Each of the panel members may be separately attachable to the frame assembly 20 through appropriate mechanism or system such as thumb screws, a snap fit, or the like. For example, each of the panel members may include a partial C-channel, such as a C-channel 228 that may engage one or more of the frame members, such as the top member 60, of the frame assembly 20. The connection or snap fit may allow for selectively connecting one or more of the panel members, such as the first panel member 208 to the frame assembly 20. It is understood that other appropriate connection mechanisms may also be provided such as thumb screws, rivets, and the like. Regardless, the panel members may be selectively attached to the frame assembly 20 to form the topper assembly 200.

The panel members, such as the panel member 208, may be formed of any appropriate materials. For example, a frame portion 220 may be formed of a fiberglass, molded polymer, or other appropriate material. A clear panel 224 may be formed of a clear or transparent polymer member, glass, or other appropriate material. Thus, the panel members, such as the first panel member 208, may provide an appropriate structure to the topper assembly 200. For example, the panel members may form a weather tight (e.g. water tight) covering to the storage area of the vehicle 24.

The cover assembly 200 may also be provided in a selected arrangement or configuration by the user. For example, the top panel 204 may be connected with the frame assembly 20 or not connected with the frame assembly. Accordingly, the cover assembly 200 may be assembled onto the vehicle 24 without the top panel 204. Thus, the sides may be enclosed with the side panels 208, 212, 216, and 218 without the top panel 204. Additionally, any of the side panels may be not included to form the cover assembly 200. Thus, the cover assembly 200 may be provided as a modular unit, as discussed above with the frame assembly 20 for assembly by the user as selected.

With continuing reference to FIG. 4, in various embodiments the panel members, such as the panel 208, are not directly connected to the frame 20. Further in various embodiments the frame 20 is not necessary as the panel members, such as the panel 208, panel 204, may include or form portions that form a frame or the port structure. Thus the panel members, such as the panels 208, 204 need not be connected to a separate frame, such as the frame 20, but may form a support structure. Thus the topper 200 may be directly connected to a vehicle, such as the vehicle 24, as discussed above. Thus the topper 200 may not include the separate frame 20 and the various panels may be modularly connected together in various embodiments.

Further, selected panels may be movable relative to one another. For example, as illustrated in FIG. 4, the panel 208 may be hinged relative to the other panels such that it is able to move from a closed or enclosed configuration (as illustrated in solid lines) to an open configuration (as illustrated in dash lines). The panel member 208 may be hingedly connected or include hinge or movable portions to move relative to the frame 20 and/or relative to the panel members adjacent or near the panel member 208. Thus the panel member 208 may move to allow access to an interior or storage area of the vehicle 24 without removing the topper 200 from the vehicle 24. The panel member 208 is merely exemplary if any appropriate member of the panels that move relative to the topper or vehicle 24, including those as discussed further herein. Thus the configurable topper assembly 200 may be provided or configurable by a user to allow access to various portions, such as allowing various panel members to move relative to one another to allow ease of access and opening of a storage area.

Turning reference to FIGS. 6 and 7, a configurable top or cover assembly 250 is illustrated. The top assembly 250 may include components similar to the top assembly 200, as discussed above, including the frame assembly 20 and side panels 208, 212, 216, and 218. The top assembly 250, however, may include a top panel 260 formed on a plurality of components or members. The top panel 260 may be formed of any appropriate number of panels including five panels 262, 264, 266, 268, and 270. Each of the panels 262-270 may include a selected dimension such as a width to span between the two top members 60, 64. Further, the individual panels 262-270 forming the top panel 260 may have a combined dimension to cover or extend the full length of the top members 60, 64. Thus, the top panel 260 may cover the top assembly 250 when fully assembled and connected as illustrated in FIG. 6. Thus, the topper 250 may enclose the storage area of the vehicle 24.

Each of the individual members of the top panel 260 may interconnect with the frame assembly 20 in any appropriate manner. For example, the individual top members 262-270 may include a selected snap or interference spit, such as a C-channel connection or portion 276, 278. The respective C-channels 276, 278 may snap to the top members 60, 64 to hold the individual panel members 262-270 to the frame assembly 20. When assembled the individual top panel members 262-270 may form the top member 260 as illustrated in FIG. 6. It is understood that other additional or alternative connections may be used to connect the individual panel members 262-270 to the frame assembly 20.

Each of the panel members 262-270 may be formed to include an identical shape and size. Thus, a single tool may be used to form each of the panels. Further, each of the panels may be formed to nest with another panel for ease and compactness or storage and/or shipping.

The user may selectively connect any appropriate number of the panels 262-270 to the frame assembly 20 to form the top member 260. For example, in various embodiments, the user may connect two of the panels 262, 264 to the frame assembly 20 to allow for a partial cover of the cargo area 26 of the vehicle 24. Various storage configurations, therefore, may be provided by selectively connecting selected numbers of the panels 262-270 to the frame assembly 20 without forming or providing the full cover of the frame assembly 20. Thus, the user may have an open area or an uncovered area of the cargo area for transporting selected components or members and/or providing for access to the storage area 26. In various embodiments, for example, a user may not include the panels 266-270 to allow for transport of a tall components, such as a refrigerator R (illustrated in FIG. 6). By not assembling the panels 266-270 to the frame assembly 20 the user may allow for an opening to accommodate a tall component, such as a refrigerator R, in the cargo area 26 of the vehicle 24. The panels 266, 270, however, may be stored in the cargo area until assembly at a later time. The individual panel members may be selectively connected to the frame assembly 20.

The individual panel members 262-270, or any of the modular panel members, may also include additional utility. For example, one or more of the panels may be used as a recovery track or mat, ramp, etc. In various embodiments, the user may remove one or more of the panels, such as the panel 262, for use as a recovery or traction may with the vehicle 24. Thus, the panels of the configurable top assembly, such as the top assembly 250, may have more than one utility and may be efficiently removed from the frame assembly 20 for an additional or alternative use.

Additionally, the side panels may be selectively connected to the frame assembly 20, as discussed above. Accordingly, the user may selectively connect only the side panels 208 and 212 and not the fore and aft or fore and end panels 216, 218 along with any selected number of the top panels 262-270. Thus, the cover assembly 250 may be selectively provided to cover all or only a portion of the cargo area 26.

With continuing reference to FIGS. 1-5, and additional reference to FIGS. 8A and 8B, a configurable top assembly 300 is illustrated. The configurable top assembly 300 may include various portions similar to those discussed above, for example in relation to the configurable top assembly 250 discussed in FIG. 6, including the one or more side panels 208, 212, 216, and 218. As discussed above, the various side panels may include side, fore, and aft panel members may be removaby attached or connected to the modular frame 20. The modular frame 20 may be connected to the vehicle 24, as discussed above, and may include various or a selected number of modular members that may be interconnected to form the modular frame assembly 20. Accordingly, the modular frame assembly 20 may be connected to the vehicle 24, as discussed above, and the selected side panels may be selectively or appropriately connected to the frame assembly 20 and/or the vehicle 24.

The configurable top assembly 300, however, may further include a top panel 320 that may include one or more members, such as a first top panel member 324 and a second top panel member 328. The two top panel members 324, 328 may be selectively connected to the modular frame assembly 20 in an appropriate manner. For example, the two top panel members 324, 328 may be hingedly connected to either the modular frame 20 and/or one of the side panels, such as to respective two longitudinal side panels 208, 212. Accordingly, the top cover 320 may be arranged in two or more configurations relative to the frame assembly 20.

If the top cover 320 is hingedly connected to the frame assembly 20 and/or the side panels 208, 212, the top assembly 320 may be mounted or configured into a closed or enclosed configuration as illustrated in FIG. 8A. The two panels may be interconnected both at an exterior or lateral edge, such as a first lateral edge 330 of the first panel member 324 and a second lateral edge 334 of the second panel member 328. A central or interior edge, such as a first central edge 338 and a second central edge 342, may be near each other and/or sealed relative to one another to sealingly enclose an interior cargo area of the vehicle 24.

Further, a lock or a latch, such as a locking or connection assembly 350 may be provided. As illustrated in FIG. 8A', the connection assembly 350 may be formed or provided with a locking or connection member 354 that interconnects, such as selectively removably, a first flange 356 of the first panel member 324 and a second flange 358 of the second panel member 328. Thus, a user may close and selectively lock or secure the top 320 including the two panels 324, 328 relative to each other to enclose the container top 300.

In various embodiments, however, the user may select to open or move the top panel members 324, 328 relative to the frame 20 and/or each other. As discussed above, the panel members 324, 328 may be hingedly connected to the side panels 208, 212 and/or the modular frame 20. The user may disengage the locking or connection mechanism 350 and open or move the panel members 324, 328 into a more vertical position such that they are more planar or substantially planar with the side panels 208, 212.

In various embodiments a hinge assembly 370 may be provided to interconnect the panels 324, 328 relative to other portions of the modular frame assembly. For example, a first hinge plate 372 may be connected to an interior underside 374 of the first panel 324 and a second hinge plate 378 may be connected to the side panel 212 and/or the frame 20. A hinge pin 382 may selectively interconnect to be hinge plates 372, 378 to hingedly connect to the panel 324 relative to the frame 20 and/or the second panel 328. It is understood that the second panel 328 may also be hingedly connected in a similar manner to the top assembly 300.

Accordingly the top assembly 300 may be provided in a substantially enclosed configuration, as illustrated in FIG. 8A, or in a more open or top open configuration as illustrated in FIG. 8B. Thus, the top void 20a may be closed or covered, partially closed or covered, or open with the top panel members 324, 328 being hingedly moved relative to the frame 20. The lock assembly 350 may assist in holding the two panel members 324, 328 relative to one another to enclose the top assembly 300. The hinge assembly 370 may be used to allow for a hinged or movable configuration of the panel members 324, 328 relative to the frame 20 to provide a more open configuration. Regardless, the two panels 324, 328 may be connected to the top assembly 300, while being movable relative thereto. Further, various straps or supports, such as a safety or support strap 386 may also secure or hold the panel 324 and/or the panel 328 (e.g. with a second strap as selected) to assist in securing the panels 324, 328 to the top assembly 300 particularly in an open configuration.

With continuing reference to FIGS. 1-5, and additional reference to FIGS. 9A and 9B, a top assembly or configurable top assembly 400 is illustrated. The configurable top assembly 400 may include portions similar to those discussed above, such as the modular frame 20 and/or one or more of the connectable or removable side panels 208, 212, 216, and/or 218.

The configurable top assembly 400 may include a top panel 410. The top panel 410 may expand across the opening or void 20a formed by the four side panels 208-218 and/or the frame 20. The opening 20a may be covered with the top panel by folding the top panel 410 wherein the top panel 410 is a sheet. For example, the top panel 410 may be formed of a selected material such as a substantially waterproof material that is flexible (e.g. Black Diamond—550-5785 fabric sold by Ultrafabrics, Inc. having a place of business at Tarrytown, N.Y.), a woven material (e.g. or other appropriate weather and abrasion resistant material), a single sheet, and/or combinations thereof. The foldable or flexible panel 410 may have an extended or unfolded configuration as illustrated in FIG. 9A, that covers the opening 20a. The top panel 410, therefore, may enclose or complete the enclosure of the top 400.

In various embodiments, edges of the top panel 410 may include clips or locking portions, such as a C-clip 420 that engages the frame members of the frame 20 such as the side frame member 60. It is understood that the clamp or connection mechanism 420 may be maneuverable by a user to engage and disengage the clamp from a selected position, such as around the frame member 60 and/or the side panel 208.

When engaged, the clamp or connection mechanism 420 may fix or hold the top panel 410 relative to the frame assembly 20 and/or the portions of the top assembly 400. The clamp or connection 420 may be disengaged to allow the top 410 to be folded, as illustrated in FIG. 9B by folded top panel 410f. The top panel 410 may be folded in a selected configuration, such as substantially in quarters such that the opening 20a may be opened a selected amount, such as about three quarters, relative to being fully enclosed or covered by the top panel 410.

External clamps or locking portions, such as a fixation strap may engage a portion of the top panel 410f to assist or maintain the top 410 in the folded configuration 410f. A retention strap 430 may extend from the top panel 410f to engage one or more of the side panels and/or the frame 20. For example, the strap 430 may extend from a first grommet or connection 434 to a second connection or grommet 436. It is understood that any appropriate number of the retention straps 430 may be provided to assist in holding the top panel 410 relative to the frame 20, or other appropriate portion of the configurable top 400, to maintain the opening 414 in an open configuration as illustrated in FIG. 9B.

Accordingly, the top panel 410 may be selectively positioned between a closed configuration, as illustrated in FIG. 9A, and an open configuration, as illustrated in FIG. 9B. A user may selectively move the top panel 410 from the closed configuration to the open configuration and back as selected by the user. Thus, the user may selectively open or close the top assembly 400 for various purposes, such as enclosing the cover area of the vehicle 24 and/or allowing transport of an item taller than the height of the frame assembly 20 and/or the side panel in the cargo area.

With continuing reference to FIGS. 1-5 and additional reference to FIG. 10 a convertible or configurable top assembly 470 is illustrated. The configurable top assembly 470 may include various portions similar to those discussed above including a modular frame 20 and the one or more selectable side panels 208, 212, 216, and/or 218. The frame assembly 20 and/or one or more of the side panels 208-218 may be assembled and positioned on the vehicle 24, as discussed above. The side panels or frame assembly may include or form the opening 20a at a top or upper edge, such as a top edge 478 of the side panels. The opening 20a may be covered by a flexible material or a fabric 480. The fabric 480 may be similar to the fabric of the top 410 or made of any appropriate material. For example, the flexible material 480 may be a marine fabric, woven material, solid or non-porous polymer sheet, or any appropriate material. Nevertheless, the flexible material 480 may be flexible or movable relative to the frame assembly 20 such as allowing a top panel 484 to move generally in the direction of the double headed arrow 488 relative to the frame assembly 20.

The top panel 484 may be formed of a flexible material or may be a ridged member. Moreover, the top panel 484 may be formed of one or more panel members, such as a first panel member 488 and a second panel member 492. The two panel members 488, 492 of the top member 484 may be hingedly openable relative to the flexible member 480, similar to the top member 320 discussed above. Accordingly, various hinges and/or locking or connection portions may be provided between the top panel 484 and the flexible member 480. Thus, the entire convertible top assembly 470 may be open even when the flexible member 480 is in an extended position, as illustrated in FIG. 10.

The flexible member 480 may move in the direction of the double headed arrow 480 with any appropriate structure or frame assembly, such as with a scissor mechanism 500. The scissor mechanism 500 may include a first scissor member 504 and a second scissor member 508 that pivot about a pivot point 512. The scissor mechanism 500, therefore, may assist in expanding the flexible member 480 into the open configuration, as illustrated in FIG. 10, and also supporting the flexible member 480 in the extended position and the top member 484 above the frame assembly 20. Thus, the scissor mechanism 500 may assist in providing a selected structure and rigidity to the flexible member 480 during movement and/or in the expanded or upper position, as illustrated in FIG. 10.

It is understood that an additional frame member may also be provided in the flexible member 480 such as a cross-bar 520. The scissor mechanism 500 may slide on the cross-bar 520 when moving to move the flexible member 480. Further, a longitudinal bar or frame member 524 may extend a length of or a portion of the length of the flexible member 480, such as similar in dimension to the elongated member 60 of the frame assembly 20.

Regardless, the height 88 of the frame assembly 20, as discussed above, may extend a selected distance. The flexible member 480 may be moved relative to the frame assembly 20 to extend a distance of the top or configurable cover assembly 470 an additional distance 530. The distance 530 may be any appropriate distance and may be selected based upon various selected activities and may be selected by a user, such as selecting a flexible member 480 of an appropriate dimensions. The scissor or support mechanism 500 and the respective frame members, if selected, may be provided in any appropriate dimension to support the flexible member 480 as well. In various embodiments, the flexible member 480 may be collapsed and not extend the distance 530 above the frame assembly 20 for various purposes, such as during transport or movement of the vehicle 24. At a selected location the flexible member 480 may be expanded into the expanded position, as illustrated in FIG. 10, for various purposes. For example, the flexible member 480 may provide a greater height between the top member 484 and an interior of the vehicle 24 for various purposes such as standing and movement by a user therein.

Turning reference to FIG. 11 a topper assembly 600 is illustrated. The topper assembly 600 may include various portions such as the frame 20 and various panel members such as the panel member 208 and/or the panel member 218. As discussed above, the frame assembly 20 is exemplary and need not be included with the topper 600. The various panel members, such as the panel 208 and the panel 218 may form or integrate a support assembly that does not require the frame assembly 20. Nevertheless, the frame assembly 20 may be included to provide a support and frame for the topper assembly 600.

In various embodiments, the topper assembly 600 may include portions, such as the panel member 218, that may move relative to the other panel portions, such as the panels 208 and 212. The panel 218 may move on a hinge or movable portion relative to the other panel members to allow for access to an interior portion of the vehicle 24. For example, the panel member 218 may hingedly move to an open configuration, as illustrated in FIG. 11, to allow access to an interior portion 604 within the topper 600 and relative to the vehicle 24. The movement of the panel member 218 may allow for ease of access and removal of any obstruction to the interior of the vehicle 24, as discussed above. The movement of the panel 218 may remove any upper or lower obstructions (e.g. frame members if present) through the topper 600 such that any item may be moved into the storage area of the vehicle 24. As discussed above, as illustrated in FIG. 6, a large container or item such as the refrigerator R may be stored or moved into the storage area 600 and transported with the vehicle 24.

Movement of the panel 218 may allow access to the cargo area for the refrigerator or large item R. The panel 218 may be hingedly moved relative to the topper 600 such that the panel 218 may be moved to a closed configuration after the large item R is positioned in the storage area. In various embodiments, the panel 218 may be removed as well and stowed in the storage area 604. Thus, the topper 600 may be used to allow for transport of large items which may be taller than the height of the panels, such as the panel 208, relative to the vehicle 24 without removal or disassembly of the topper 600.

The topper 600, or any of the toppers as discussed above, may be configured for use in various configuration for ease of access to a storage area and use of the topper assembly 600 for various purposes. With the topper 600, the vehicle 24 may be used to transport selected items of different sizes that may not fit in any storage area of the vehicle 24 with the topper 600 fully enclosed. In various embodiments, as discussed above, the topper 600 may be augmented to allow for access, storage, and/or movement of items larger than the storage volume defined by the topper 600 and the vehicle 24.

Accordingly, a convertible or configurable top assembly or cargo containment assembly may be provided relative to a vehicle 24. The convertible or configurable top assembly may be selectively configured by a user for various purposes such as a shelter, storage capacity or configuration, or other appropriate reasons. Nevertheless, the convertible and/or modular cover assembly may allow a user greater or selected enclosures relative to the vehicle 24 during movement and/or selected use of the vehicle 24.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A configurable cover operable to be connected to a vehicle, comprising:
   a frame assembly configured to be connected to an upper surface of the vehicle;
   a panel member having a frame connection system configured to couple the panel member to the frame assembly;
   an extension assembly connected to the frame assembly having a flexible side to expand and enclose an area between the frame assembly and the panel member; and
   a vehicle connection system configured to selectively connect the panel member to the vehicle and at least partially enclose a volume of the vehicle;
   wherein the extension assembly connected to the frame assembly having a flexible side to expand and enclose an area between the frame assembly and the panel member, comprises:
      a movement assembly to move the panel member away from the frame assembly;
      wherein the flexible side includes a fabric that expands as the movement assembly moves the panel member.

2. The configurable cover of claim 1, wherein the frame assembly comprises:
   a plurality of frame members;
   wherein a first frame member of the plurality of frame members includes a first frame connection portion;
   wherein a second frame member of the plurality of frame members includes a second frame connection portion;
   wherein the first frame connection portion is configured to connect to the second frame connection portion to selectively connect the first frame member to the second frame member.

3. The configurable cover of claim 1, wherein the frame assembly comprises:
   a first longitudinal frame member;
   a second longitudinal frame member;
   a first vertical frame member; and
   a first horizontal frame member.

4. The configurable cover of claim 3, wherein the frame assembly includes a height defined at least by the first vertical member when connected to the first longitudinal frame member and the first horizontal frame member.

5. The configurable cover of claim 3, wherein the frame assembly includes a second vertical member;
   wherein the frame assembly forms a panel receiving section by connection of the first longitudinal frame member, the first vertical frame member, the second longitudinal frame member, and the second vertical member.

6. The configurable cover of claim 1, wherein the panel member comprises a plurality of panel members.

7. The configurable cover of claim 1, wherein the panel member comprises a plurality of panel members;
   wherein the plurality of panel members includes at least one side panel and at least one top panel.

8. The configurable cover of claim 7, wherein the at least one side panel is a rigid panel and at least one top panel is a rigid panel.

9. The configurable cover of claim 7, wherein the at least one top panel is a flexible member;
   wherein the flexible member is selectively positioned in at least one of (i) an unfolded covering position or (ii) a folded uncovering position.

10. The configurable cover of claim 7, wherein the plurality of panel members are configured to support the plurality of panel members to selectively at least partially enclose a selected volume of the vehicle.

11. The configurable cover of claim 1, wherein the movement assembly includes a scissor mechanism operable to move the panel member away from the frame assembly.

12. A configurable cover operable to be connected to a vehicle, comprising:
   a panel member; and
   a vehicle connection system configured to selectively connect the panel member to the vehicle and at least partially enclose a volume of the vehicle;
   a frame assembly comprising:
      a first longitudinal frame member;
      a second longitudinal frame member;
      a first vertical frame member;
      a first horizontal frame member; and
      a second vertical member;
      wherein the frame assembly forms a panel receiving section by connection pf the first longitudinal frame member, the first vertical frame member, the second longitudinal frame member, and the second vertical member; and
   a frame connection system that includes a C-shaped channel extending from the panel member configured to engage at least one of the first longitudinal frame member, the first vertical frame member, the second longitudinal frame member, or the second vertical member.

13. The configurable cover of claim 12, wherein the vehicle connection system includes a vehicle connection member including at least a first member configured to extend from the frame assembly to the vehicle.

14. The configurable cover of claim 13, wherein the vehicle connection member further comprises an adjustable fastener to selectively engage the vehicle from the first member.

15. A configurable cover operable to be connected to a vehicle, comprising:
   a frame assembly configured to be connected to an upper surface of the vehicle;
   a panel member having a frame connection system configured to couple the panel member to the frame assembly;
   an extension assembly connected to the frame assembly having a flexible side to expand and enclose an area between the frame assembly and the panel member; and
   a vehicle connection system configured to selectively connect the panel member to the vehicle and at least partially enclose a volume of the vehicle;
   wherein the panel member comprises a plurality of panel members;
   wherein the plurality of panel members includes at least one side panel and at least one top panel;
   wherein the at least one side panel comprises at least four side panels to enclose a perimeter of the selected volume.

16. A configurable cover operable to be connected to a vehicle, comprising:
a frame assembly configured to be connected to an upper surface of the vehicle;
a panel member having a frame connection system configured to couple the panel member to the frame assembly;
an extension assembly connected to the frame assembly having a flexible side to expand and enclose an area between the frame assembly and the panel member; and
a vehicle connection system configured to selectively connect the panel member to the vehicle and at least partially enclose a volume of the vehicle;
wherein the panel member comprises a plurality of panel members;
wherein the plurality of panel members includes at least one side panel and at least one top panel;
wherein the at least one top panel includes a first top panel member and a second top panel member;
wherein the first top panel member and the second top panel member are configurable in at least one of (i) a covering position when at least both the first top panel member and the second top panel member are connected to the frame assembly or (ii) an open position when less than both of the first top panel member and the second top panel member are connected to the frame assembly.

17. The configurable cover of claim 16, further comprising:
a first hinge connected to the first top panel member and at least the frame assembly such at the first top panel member is hingedly moveable relative to frame assembly between the at least one of (i) a covering position or (ii) an open position.

18. A method of forming a configurable cover operable to be connected to a vehicle, comprising:
providing a frame assembly including a plurality of frame members, wherein at least a sub-plurality of frame members of the plurality of frame members are configured to be fixedly connected to the vehicle and define a side portion extending from the vehicle and an open top portion;
providing a panel member configured to be connected to at least a portion of the frame assembly to cover at least a portion of the top portion over a void defined by the frame assembly;
configuring the provided panel member to move relative to the provided frame assembly to move between an enclosed configuration and an open configuration over the top portion;
configuring the frame assembly to be connected to the vehicle to cover at least a portion of a volume of the vehicle; providing the panel member as a first panel member and a second panel member; wherein both the first panel member and the second panel member are configured to move between the enclosed configuration and the open configuration over the top portion.

19. The method of claim 18, further comprising:
providing a connection system configured to selectively connect the panel member to the frame assembly and at least partially enclose a volume of the vehicle.

20. The method of claim 19, wherein providing the frame assembly includes providing a frame assembly with a plurality of the voids;
wherein providing the panel member further includes:
providing a plurality of panel members;
providing at least one panel of the plurality of panel members to be selectively placed to cover at least one void of the plurality of voids.

21. The method of claim 18, further comprising:
providing a hinge to hingedly connect at least one of the panels to the side portion of the frame assembly.

22. The method of claim 18, further comprising:
providing the panel member as a plurality of panel members;
wherein configuring the provided panel member to move relative to the provided frame assembly to move to the enclosed configuration includes installing the plurality of panel members and to move to the open configuration to install a selected sub-plurality of the plurality of panel members.

23. The method of claim 18, further comprising:
providing the panel member as a flexible member;
wherein configuring the provided panel member to move relative to the provided frame assembly to move to the enclosed configuration includes at least one of unfolding or unrolling the flexible member and to move to the open configuration includes at least one folding or rolling the flexible member on itself.

24. A method of forming a configurable cover operable to be connected to a vehicle, comprising:
assembling a plurality of frame members into a frame assembly having a side and a top above the vehicle and defining a void within the frame assembly;
connecting the frame assembly to the vehicle to cover at least a portion of a volume of the vehicle;
connecting a top panel member to at least a portion of the frame assembly to at least one of at least partially cover the top of the void defined by the frame assembly and entirely cover the top of the void defined by the frame assembly;
wherein at least the top panel member is a flexible panel member that is operable to be rolled or folded to at least partially cover the top and unrolled or unfolded to entirely cover the top.

25. The method of claim 24, wherein the frame assembly includes a plurality of the voids;
connecting a plurality of side panel members to selectively cover at least a selected sub-plurality of the plurality of voids.

26. The method of claim 25, further comprising:
covering at least one void with a first panel member of the plurality of panel members and a second panel member of the plurality of panel members;
moving at least the first panel member relative to the second panel member to at least partially open the void covered by the first panel member and the second panel member.

27. A method of forming a configurable cover operable to be connected to a vehicle, comprising:
providing a frame assembly configured to be connected to and extending from the vehicle and define a top void;
providing a first panel member and a second panel member;
configuring the first panel member and the second panel member to be hingedly connected to at least a portion of the provided frame assembly and to selectively extend over the top void; and
configuring at least one panel of the second panel to hingedly move between a closed configuration and an open configuration;
wherein the open configuration at least a portion of the top void is open.

28. The method of claim 27, wherein the first panel and the second panel are configured to be connected to the vehicle in a first configuration and a second configuration.

29. The method of claim 27, further comprising:
connecting the first panel or the second panel to the frame assembly in a selected configuration; and
configuring the frame assembly to be connected to the vehicle to cover at least a portion of a volume of the vehicle.

30. The method of claim 27, further comprising:
providing a hinge to hingedly connect at least one of the panels to the frame assembly.

31. The method of claim 27, further comprising:
providing a first connection portion with the first panel; and
providing a second connection portion with the second panel;
wherein the first connection portion and the second connection portion are fixed together when in the closed configuration.

* * * * *